March 2, 1971   J. B. RUHLIN   3,567,243
VEHICULAR UNDERCARRIAGE AND SUSPENSION
Filed July 2, 1969   7 Sheets-Sheet 1

INVENTOR.
JOHN B. RUHLIN
BY Hamilton, Cook,
Renner & Renner
ATTORNEYS

March 2, 1971    J. B. RUHLIN    3,567,243
VEHICULAR UNDERCARRIAGE AND SUSPENSION
Filed July 2, 1969    7 Sheets-Sheet 4

INVENTOR.
JOHN B. RUHLIN
BY Hamilton, Cook,
Renner & Kenner
ATTORNEYS

INVENTOR.
JOHN B. RUHLIN
BY Hamilton, Cook,
Renner & Kenner
ATTORNEYS

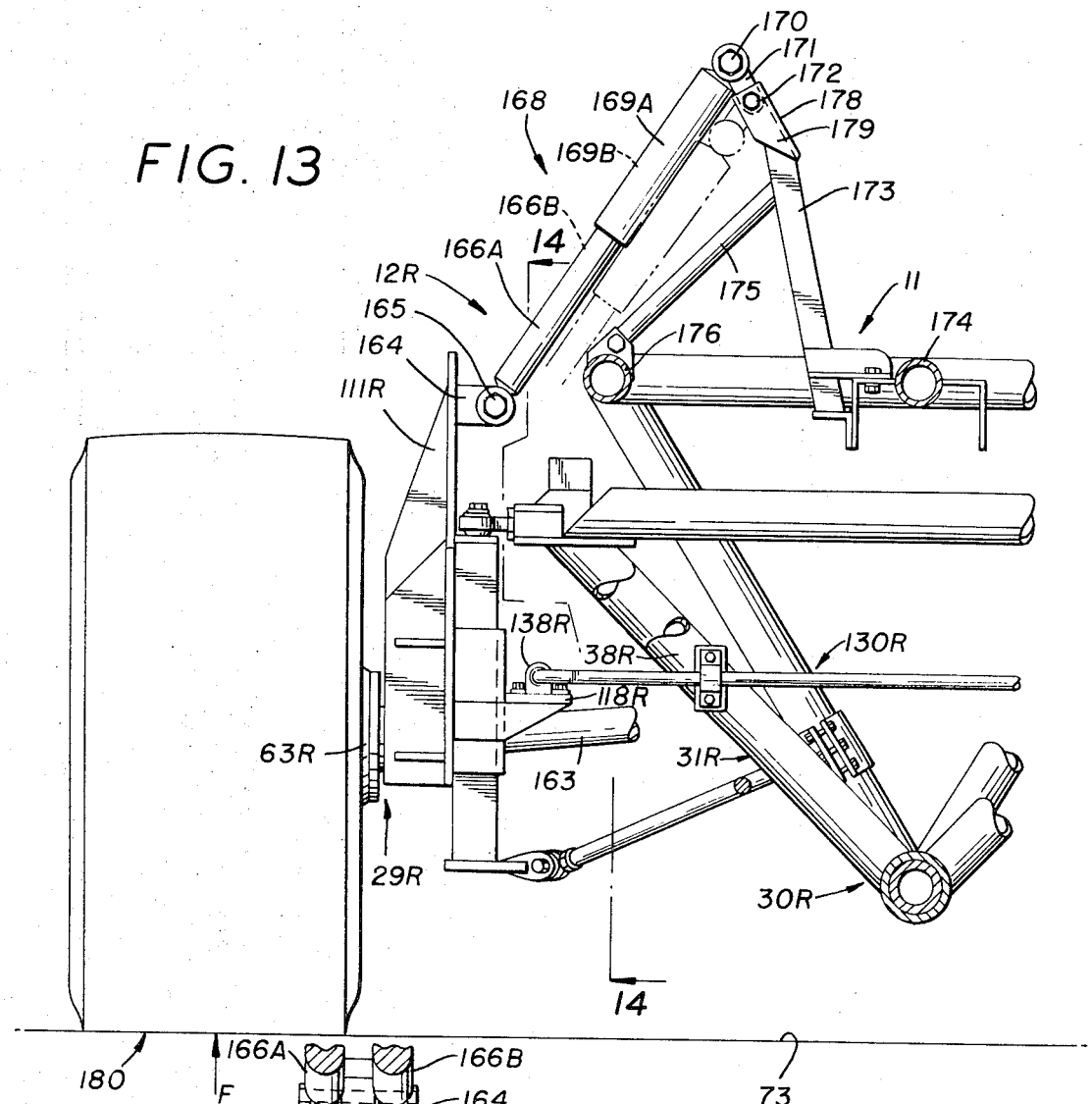
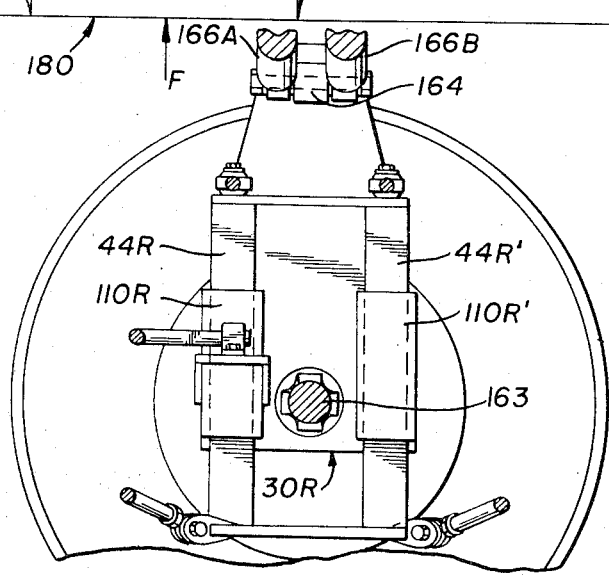

United States Patent Office 3,567,243
Patented Mar. 2, 1971

3,567,243
VEHICULAR UNDERCARRIAGE AND SUSPENSION
John B. Ruhlin, Akron, Ohio, assignor to The John G. Ruhlin Construction Company, Akron, Ohio
Filed July 2, 1969, Ser. No. 838,441
Int. Cl. B62d 7/00
U.S. Cl. 280—96.2
20 Claims

ABSTRACT OF THE DISCLOSURE

An undercarriage and suspension system for a vehicle. The vehicle chassis has a longitudinal roll axis delineated by a mounting beam. An axle is rotatably connected to the mounting beam and a pillar is dependingly supported from a pivot means on each lateral end of the axle. One end of a pair of control rods, each adjustable for length, is connected to each pillar in spaced relation below the pivot means, and the opposite ends of the control rods are individually secured to the chassis at selective locations upwardly of the mounting beam but at least beneath the center of gravity of the sprung mass of the vehicle. Spindle means on each pillar support the wheels and, for steering, each pillar may be rotatable about its own axis by the rods connected between steering arms on the pillars and a compensating member rotatably mounted on the axle. In order to provide the effect of independent suspension, the spindle means are secured to sleeves slidably supported on the pillars. An equalizer beam is rotatably mounted on the axle about an axis generally transversely of the pillars and is operatively connected between the sleeves mounted on those pillars. A spring means is also operatively connected between the sleeves and the chassis, and, in some embodiments a spring means may be operatively connected between the sleeves and a stanchion rotatably secured to the mounting beam.

BACKGROUND OF THE INVENTION

The present invention relates to an undercarriage and suspension system wherein the inertia-induced roll of the chassis during a turn beneficially controls the camber of the wheels so that they are positioned most appropriately to receive maximum lateral thrust from the roadway— i.e., centripetal force—and thus increase the potential for resisting the centrifugal tendency of the vehicle—i.e., the tendency for the vehicle to lose lateral traction and slide, or "break away."

Newton's first law—the law of inertia—states that every body persists in a state of rest or uniform motion in a straight line unless compelled by external force to change that state. The tendency of a body to continue to move in a straight line is particularly evident when one attempts to move that body along an arcuate path. In such a case, the body attempts to leave the arcuate path and move along a tangent thereto. This tendency is termed centrifugal tendency. Thus, when a body is moved along an arcuate path, a force is required to be exerted against the body in a direction toward the center of the arc along which the body is moving. This force is a centripetal force.

When a vehicle takes a corner at any considerable speed it tends to leave the turn unless sufficient centripetal force is applied to maintain the vehicle in the turn. In common parlance this centripetal force is referred to as the "cornering force." The cornering, or centripetal, force available to a vehicle is solely the result of lateral thrust applied by the roadway to the tread surface of the tires. By increasing the width of the tire treads—witness the extreme width of the tires on today's racing cars and, increasingly, on high performance passenger cars—automotive, and tire, engineers are attempting to increase the contact area between the tire and roadway, even during a high speed turn in order to avail the vehicle of the greatest possible centripetal force.

Suspension system geometry is also of extreme importance in securing the application of centripetal force to the vehicle. The suspension will affect not only the camber of the wheels as the chassis rolls during a turn —heretofore adversely—but also the amount of load transfer to the wheels on the outside of the turn.

Wheels are cambered when the distance between the toe, or ground contact point, of opposed wheels differs from the distance between the tops of those wheels— i.e., a positive camber exists when the wheels are inclined, upwardly and outwardly with respect to a plane oriented vertically of the road surface; negative camber exists when the wheels are inclined upwardly and inwardly. Particularly in a high speed turn, it is desirable to maintain wheel orientation with respect to the roadway as nearly constant as possible; in other words, it is most desirable not to permit excessive adverse variation in camber, or inclination, particularly with respect to that wheel located on the outside of a turn as will hereinafter be more fully explained. By minimizing adverse change of camber in a turn, greater tread contact is obtained with the roadway so that the centripetal force applied by the roadway can be concomitantly increased.

Load, or weight, transfer—the increase in loading applied to the outside wheel during the turn—imposes the greatest portion of the side thrust (centripetal force) generated by the roadway against the outside wheels inasmuch as the centripetal force received through any wheel is the product of the coefficient of friction between the tread of the tire mounted on that wheel and the roadway multiplied by the weight supported by that wheel. Although there is apparently some diversity of opinion as to whether this result is or is not desirable, some authorities theorize that both the inside and outside wheels will receive the side thrust generated against the wheels in a turn on a more equal basis if weight transfer is minimized.

Chassis roll is primarily responsible for weight transfer. Roll occurs as the result of centrifugal force acting through the center of gravity of the sprung mass, and that mass rolls about a reference line called the roll axis. When the center of gravity of the sprung mass is above the roll axis, the chassis rolls toward the outside of the turn. This is the usual situation, and, as the chassis rolls, the center of gravity for the sprung mass is displaced toward the outside of the turn. It is this displacement of the center of gravity that increases the load on the outer wheels and decreases the load on the inner ones. From this standpoint alone it would appear desirable to raise the roll axis toward the center of gravity for the sprung mass in order to minimize displacement of the center of gravity and thus reduce weight transfer. However, because the line of action of the centrifugal force generated by the sprung mass during a turn is applied to the unsprung mass through the roll axis, the higher the roll axis is located the more tendency there is for the inside wheels to be lifted completely off the roadway—representing the maximum degree of weight transfer.

Accordingly, the approach has heretofore been to lower the roll axis within practical limits and rely upon antiroll bars to constrain the degree of roll as much as possible.

It has also been found that the ease with which a vehicle is steered from a straightaway course into a turn and from a turn back to a straightaway course can be greatly varied by the degree of caster employed by the steered wheels.

Minimum effort is required to steer a vehicle from a straightaway course into a turn when a zero degree of caster is employed by the steered wheels, because, as increasing degrees of caster are employed, the vehicle must be "lifted" through increased increments to turn the wheel from a straightaway orientation. However, positive caster does provide a centering effect so that if some degree of caster is employed by the steered wheels considerably less effort is required to return from a curve to, and maintain, a straightaway course.

Heretofore, suspensions have employed a fixed degree of caster that was a compromise between that desired for straightaway driving and turning.

Inexorably associated with control of the camber and caster through a turn is the steering mechanism incorporated into the undercarriage. When the front wheels of a vehicle are steered to direct the vehicle along an arcuate path, it must be appreciated that the inside and outside wheels will be moving along arcs of different radii so that when both the steered wheels are turned through the same angular range to effect any given turn a "scrubbing" contact will exist between the tread on at least one of the tires mounted on the steered wheels and the roadway. That is, the direction along which the vehicle is moving is not coincident with the direction in which the steered wheels—and tread of the tires mounted thereon— are moving along the roadway. The resulting lateral movement of at least one of the tires thus "scrubs" the tread across the roadway. The prior art has appreciated that the ideal situation would be to have both of the steered wheels remain tangent to their particular circle of turn through their entire steering range. Although this result, known as the Ackerman effect, constitutes the paragon of wheel movement through a turn, it is rarely approached without exceedingly complex steering mechanisms.

Steering mechanisms, and particularly those intended to provide the Ackerman effect, have, heretofore, been considerably further complicated if an attempt is made to connect steering tie rods forwardly of the axes about which the wheels turn to effect steering. Yet, it is widely appreciated that such a connection may be highly desirable because it permits, when the tie rods are otherwise properly oriented, the application of principally tensile stresses to the tie rods in response to braking and/or shock loading against the wheels from chuck holes or the like, which tend to "toe out" the steered wheels.

Heretofore, also, the use of a sliding pillar to effect independent wheel suspension has also been fraught with what appeared to be insurmountable difficulties. Yet, the independent support of the running gear provided thereby allows fuller theoretical realization of the benefits available from today's wide, low tires by permitting the most favorable straightaway stability in conjunction with the best balance between ride and handling. Of primary significance in providing these favorable characteristics is the low unsprung weight possible with independent suspensions, coupled with the avoidance of camber change resulting purely from jounce as the vehicle moves along a straightaway course. While these potential benefits have been appreciated, their actual achievement by the prior art has only been moderately successful, and then, limited to constructions wherein the sliding pillar was connected directly to the frame. No one has ever conceived of supporting the sliding pillar from an axle that was itself movable with respect to the vehicle chassis—first, because no one has appreciated the advantages that could be achieved thereby, and, second, because the necessity for providing an effective suspension between the three relatively movable components is staggering to the imagination.

SUMMARY OF THE INVENTION

It is, therefore, one object of the present invention to provide an undercarriage for a vehicle which harnesses the inertia of the sprung mass beneficially to control the camber of the wheels during a turn.

It is another object of the present invention to provide an undercarriage as above, the geometry of which allows preselection as to whether weight transfer to the outside wheel during a turn shall be minimized.

It is still another object of the present invention to provide an undercarriage, as above, whcih permits a predetermined change of caster—or, selectively, no change— as the vehicle is steered from a straightaway course into a turn, and vice versa.

It is yet another object of the present invention to provide an undercarriage in which the steering tie rods can be attached forwardly of the axes about which the wheels are turned for steering and yet substantially achieve the Ackerman effect.

It is a further object of the present invention to provide an undercarriage, as above, in which the running gear may be carried on sliding pillars supported from an axle means to obtain the benefit of independent suspension.

It is a still further object of the present invention to provide an effective, yet relatively uncomplicated, suspension system that interconnects the running gear to the axle means and the axle means to the chassis of the vehicle in which the undercarriage, as above, is incorporated.

It is an even further object of the present invention to provide an undercarriage, with a suspension system, as above, that combines the advantages of the above-listed objects with maximum ease of steering through a turn as well as along a straightaway.

These and other objects, together with the advantages thereof over existing and prior art forms which will become apparent from the following specification, are accomplished by means hereinafter described and claimed.

In general, an undercarriage embodying the concept of the present invention has an axle means from which the running gear is supported. Although the axle means may be rigidly secured to the chassis, a suspension system is preferably interposed between the axle means and the chassis. Similarly, too, although the spindle means on which the wheel of the running gear is journaled may be rigidly secured to pillars pivotally supported from the axle means, the spindle means will preferably be slidingly mounted on their respective pillars in order to afford the benefits of independent suspension to each wheel. In the latter event the suspension system will be expanded to interpose its effect between the running gear, the axle means and/or the chassis, as well.

Irrespective of the existence, or extent, of the suspension system or the nature of the connection between the running gear and the axle means, the axle means has opposed axle arms that are rotatably mounted on the vehicle chassis so that relative swinging movement can be accommodated between the chassis and the axle arms about the longitudinal roll axis of the chassis.

The pillars are pivotally depended, one from the laterally outer end of each axle arm. At least one control rod is provided for each axle arm, that control rod for each axle arm being pivotally connected to the pillar supported from that axle arm in spaced relation beneath the connection of that pillar to the axle arm and the opposite end of the control rod being connected to the chassis upwardly of the rotatable mounting by which the axle arms are mounted to the chassis.

In order to provide caster control, a pair of control rods are associated with each axle arm. The pair of control rods for each axle arm extend divergently from each pillar and are connected, by anchor means, to longitudinally spaced, roll transfer means presented by the chassis. The anchor means are individually positionable along the roll transfer means selectively to vary the vertical separation between the roll axis and the connection between the control rods and the roll transfer means. To accommodate the variable location of the connection between the control rods and the roll transfer means, the lengths of the control rods are selectively adjustable. Selection of the positions for the anchor means along the roll transfer means in coordination with selection of the lengths of the control rods permits predetermined regulation of the caster for the wheels not only when the car is traveling along a straightaway course but will also provide a predetermined change in the degree of caster during a turn, if desired. The selected change in caster occurring during a turn is also effected by harnessing the inertia of the sprung mass.

Steering of a vehicle provided with an undercarriage embodying the concept of the present invention is accomplished by rotation of the pillars about their own axes, and, in order that shock loading to the wheels will generally impart a tensile stress to the steering tie rods, they are oriented to extend forwardly from a compensating member so that their outer ends connect to steering arms which extend forwardly of each pillar when the wheels are oriented for a straightaway course. The compensating member to which the opposite ends of the tie rods are connected is mounted for rotation about an axis substantially parallel to the axes of the pillars, the inner end of each tie rod being connected to that side of the compensating member which is remote from the outer steering arm connection of said tie rod, so that the inner end portions of the tie rods overlap. Rotation of the compensating plate is selectively controlled by a customary steering box operatively connected thereto.

As noted above, the running gear may be slidably supported on the pillars in order to obtain the benefits of independent suspension for the wheels. As such, a suspension system should interconnect the running gear, the axle and the chassis. In the preferred form, a common spring means, rotatably supported about the roll axis of the chassis, resiliently interconnects the running gear on opposite sides of the axle means, and an equalizer beam, rotatably mounted on the axle means upwardly of the roll axis, torsionally interconnects the opposed running gear through the axle means biasingly to urge a reference line on the latter into parallel orientation with a plane incorporating the ground contact of the wheels supported on the axle means. Further spring means connects the undercarriage to the chassis.

One preferred embodiment—which depicts not only the basic concept for controlling camber through a turn in response to the inertia of the sprung mass but also the refinements by which caster can be varied, the Ackerman effect substantially achieved and the benefits of independent suspension obtained—and two variations thereof—one variation directed to the camber control mechanism and the second variation directed to the suspension system—are shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 13 is a view similar to FIG. 5 depicting a variation in the suspension and running gear incorporated in the undercarriage; and FIG. 14 is a longitudinal section taken substantially on line 14—14 of FIG. 13 depicting, in elevation, the mechanical interconnection between the running gear, the axle means and the suspension depicted in FIG. 13.

DESCRIPTION OF THE PREFERRED EMBODIMENT

Figure 1:
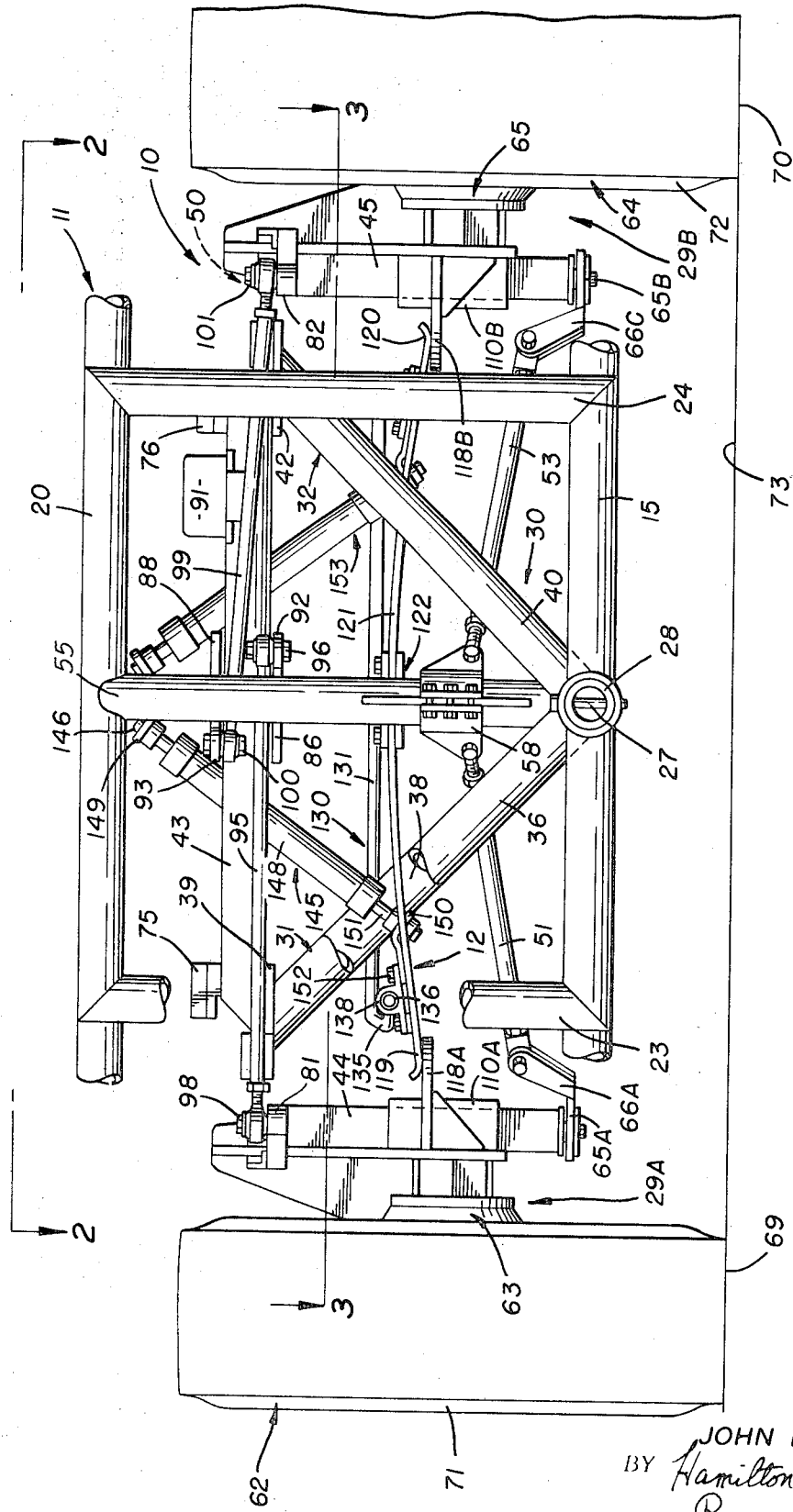
FIG. 1 is a frontal elevation depicting an undercarriage, suspension system and steering mechanism embodying the concept of the present invention in combination with the framework of a vehicle chassis, the latter being partly broken away.

Referring more particularly to the drawings, an undercarriage, indicated generally by the numeral 10, supports a vehicle chassis 11 through the medium of a suspension system, indicated generally by the numeral 12. Although the particular chassis 11 represented in the drawings is intended to be adapted for a racing vehicle, it will be apparent upon completion of this description that the subject undercarriage 10 and suspension system 12 are readily adaptable to a wide variety of vehicles.

The framing, as best seen in FIGS. 1–4, of the frontal portion of the chassis 11 depicted has laterally spaced, lower side members 13 and 14 rigidly interconnected by lower, transverse members 15 and 16 and laterally spaced upper side members 18 and 19 rigidly interconnected by upper transverse members 20 and 21. The upper side and transverse members 18–21 are interconnected in fixed spacial relation above the lower side and transverse members 13–16 by four corner posts 23, 24, 25 and 26.

A mounting beam 28 extends between, and is nonrotatably secured to, the lower transverse members 15 and 16 medially of the lower side members 13 and 14. This mounting beam 28 delineates the longitudinal, roll axis 27 of the chassis 11 about which relative swinging movement between the undercarriage 10 and the chassis 11 is accommodated. The undercarriage 10 is comprised of opposed running gear 29A and 29B supported from an axle means 30.

The truss-like axle means 30 has opposed axle arms 31 and 32 rotatably mounted to the chassis 11 by gudgeon means 33 embracing the mounting beam 28. Specifically, the gudgeon means 33 may comprise a pair of longitudinally spaced sleeves 34 and 35 mounted for rotation on the mounting beam 28 in juxtaposition to the lower, transverse members 15 and 16, respectively. Axle arm 31 comprises a rib 36 affixed to sleeve 34 and a rib 38 affixed to sleeve 35. The two ribs 36 and 38 converge from the sleeves 34 and 35 to a gusset plate 39 that joins the ends thereof laterally outwardly of the gudgeon means 33. Similarly, axle arm 32 comprises a rib 40 affixed to sleeve 34 and a rib 41 affixed to sleeve 35. The ribs 40 and 41 converge oppositely of ribs 36 and 38 and are joined to a gusset plate 42.

As best shown in FIG. 1, the axle arms 31 and 32 may be inclined laterally and upwardly from the gudgeon means 33 and are braced into the truss-like, unitary axle means 30 by a chord member 43 that is secured to, and extends between, the opposed gusset plates 39 and 42.

Figure 6:
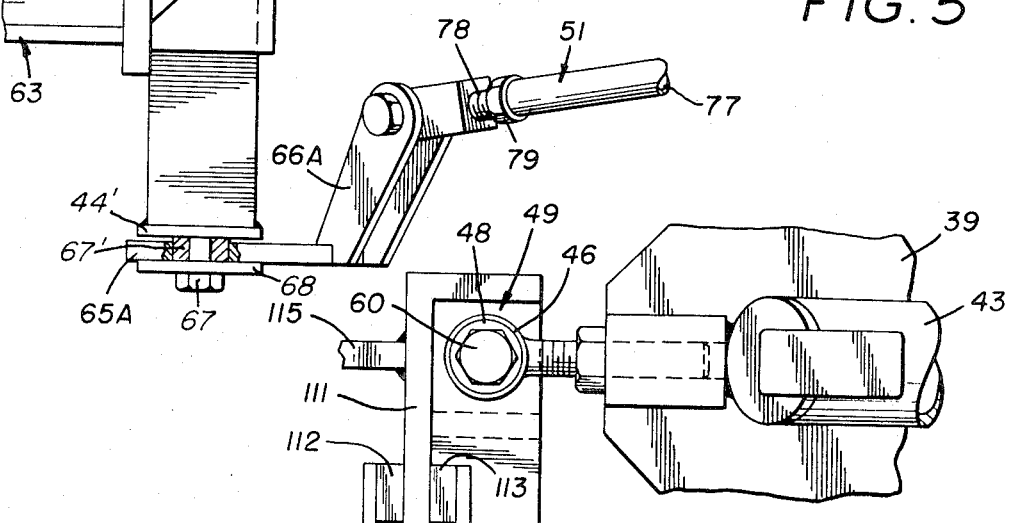
FIG. 6 is a top plan taken substantially on line 6—6 of FIG. 5.

A pillar 44 is pivotally supported from axle arm 31, and a corresponding pillar 45 is pivotally supported from axle arm 32. As best seen in FIG. 6, the pivotal connection between pillar 44 and axle arm 31 may be accomplished by mounting a socket 46 rigidly from the gusset plate 39. A ball 48 is pivotally received in socket 46. The ball 48 and socket 46 comprise a pivotal means 49 at the lateral termination of axle arm 31 from which the pillar 44 is dependingly secured. The pillar 45 is similarly secured in depending relationship from pivot means 50 at the lateral termination of axle arm 32.

At least one control rod is provided for each axle arm, and, as shown in the preferred embodiment, a pair of control arms may be provided for each axle arm. In this event caster as well as camber may be effectively controlled in response to the forces of inertia acting upon the chassis 11, as will be hereinafter more fully explained.

Figure 2:
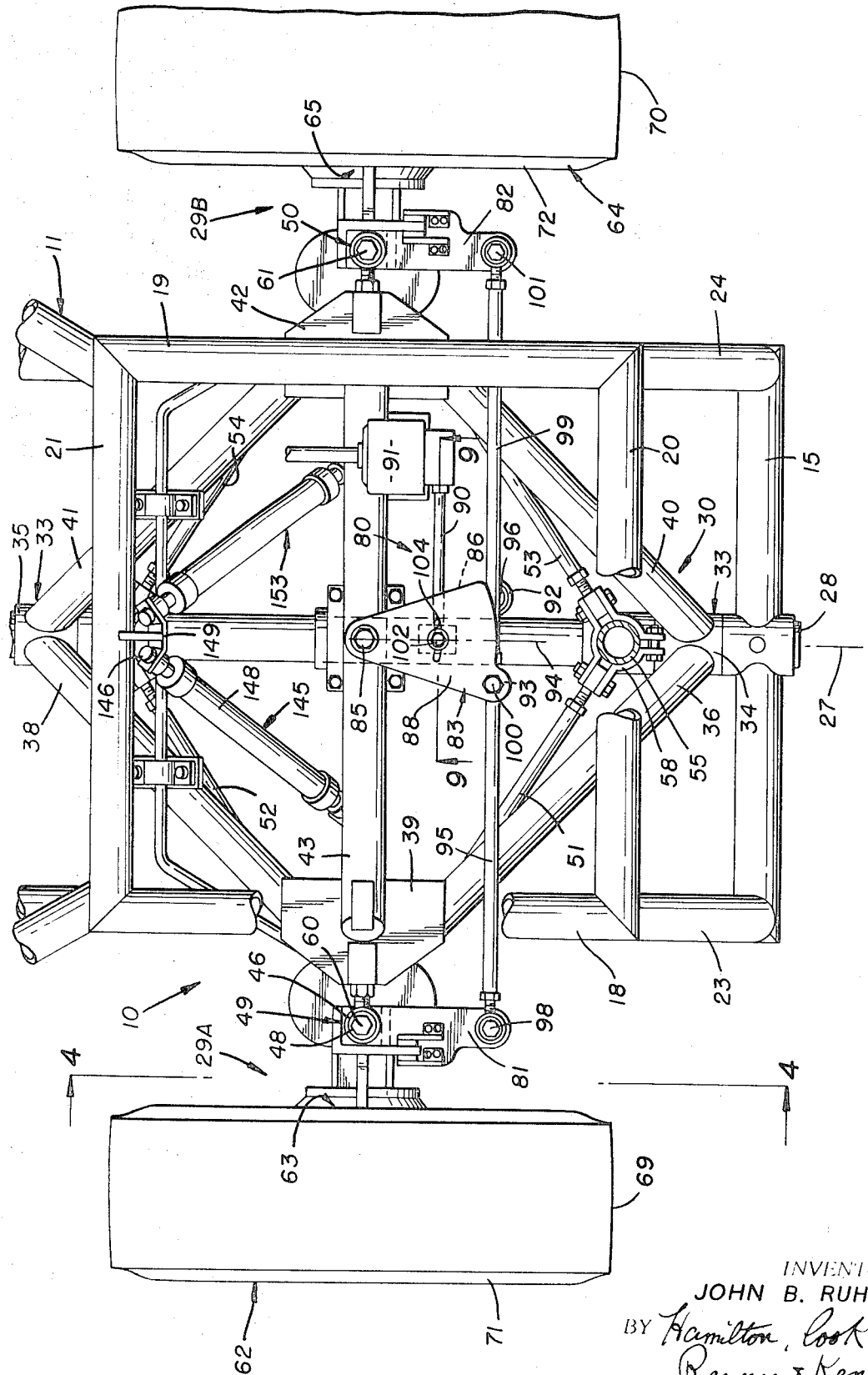
FIG. 2 is a top plan taken substantially on line 2—2 of FIG. 1 with the chassis also being partly broken away.
Figure 3:
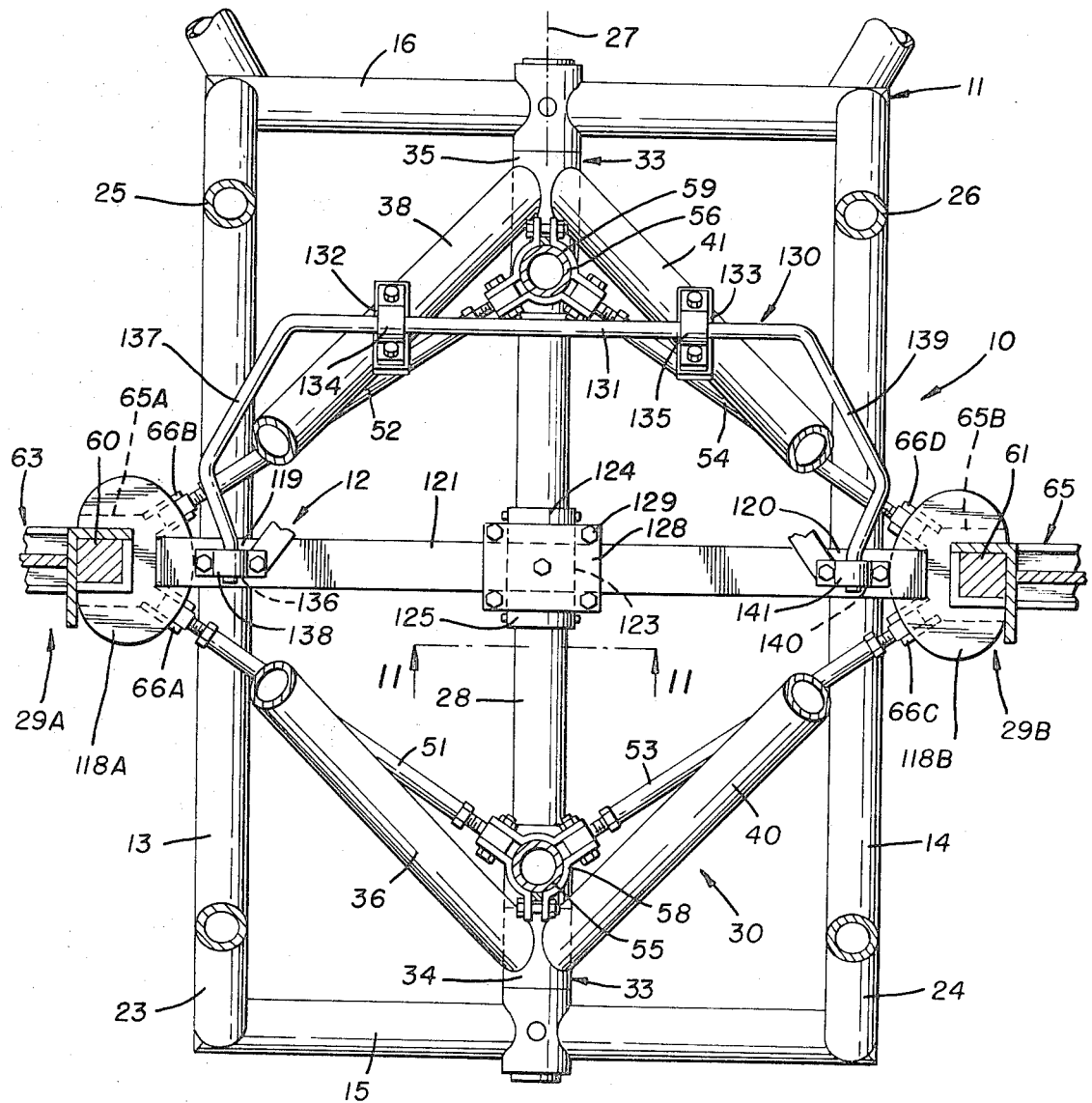
FIG. 3 is a horizontal section, taken substantially on line 3—3 of FIG. 1.
Figure 4:
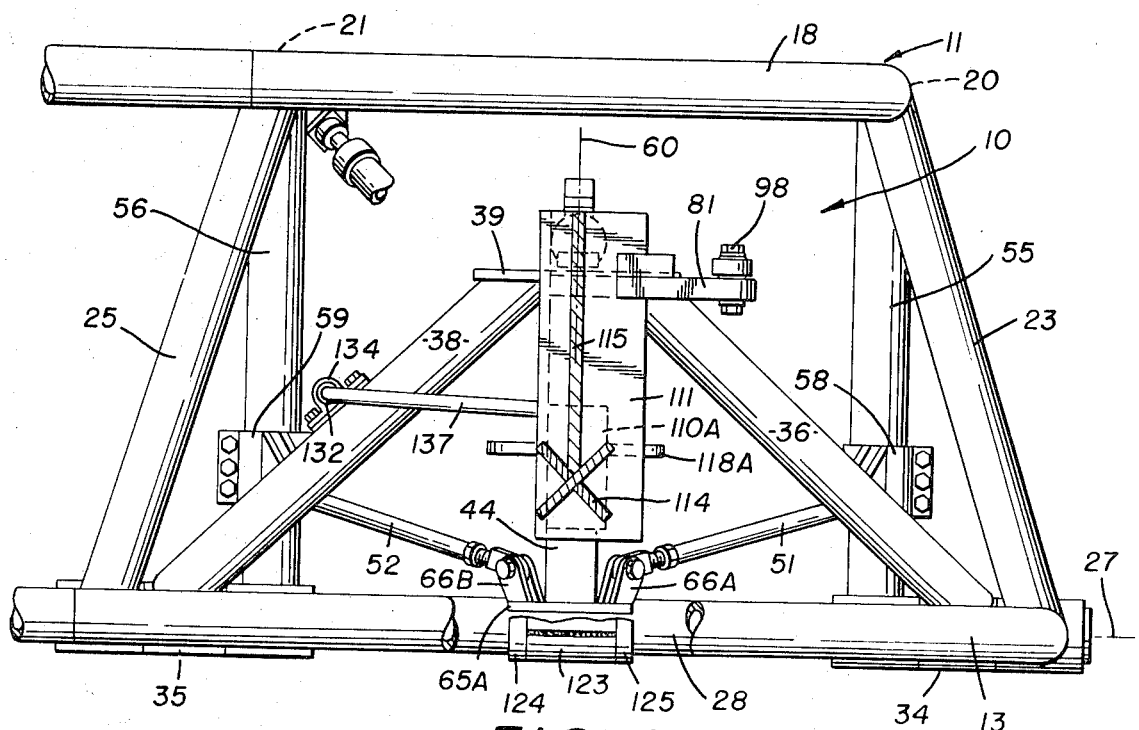
FIG. 4 is a longitudinal section, taken substantially on line 4—4 of FIG. 2, depicting the chassis, which has been partly broken away, in side elevation.

One end of each of the two control rods 51 and 52 associated with axle arm 31 as well as one end of each of the two control rods 53 and 54 associated with axle arm 32 are connected to the chassis 11 upwardly of the gudgeon means 33. As shown in FIGS. 2–4, a pair of roll transfer posts 55 and 56 are presented by chassis 11. The roll transfer post 55 extends substantially vertically between the mounting beam 28 and the forward, upper transverse member 20. Roll transfer post 56 extends substantially vertically between the mounting beam 28 and the rearward, upper transverse member 21. Anchor means in the form of collars 58 and 59 are adjustably positionable along roll transfer posts 55 and 56, respectively. One end of the control rod 51 associated with axle arm 31 is pivotally connected to one side of collar 58 and one end of the control rod 53 associated with axle arm 32 is pivotally connected to the opposite side of collar 58. Similarly, one end of the control rod 52 associated with axle arm 31 is pivotally connected to one side of collar 59, and one end of the control rod 54 associated with axle arm 32 is pivotally connected to the opposite side of collar 59.

The opposite ends of control rods 51 and 52 are pivotally secured to pillar 44 in spaced relation beneath the pivot means 49 by which pillar 44 is dependingly supported from axle arm 31. Similarly, the opposite ends of control rods 53 and 54 are pivotally secured to pillar 45 in spaced relation beneath the pivot means 50 by which pillar 45 is dependingly supported from axle arm 32.

As will be hereinafter more fully explained, steering is accomplished by selective rotation of the pillars 44 and 45 about their own axes 60 and 61, respectively—the steered wheel 62 being supported on a spindle means 63 extending laterally outwardly of pillar 44 and the steered wheel 64 being supported on a spindle means 65 extending laterally outwardly of pillar 45. The wheels 62 and 64, together with the spindle means 63 and 65 and their attachment to the pillars 44 and 45, comprise the running gear 29A and 29B. As such, a pedestal 65 is preferably interposed at the rotatable connection between each pillar and its associated control rods and, when interference might occur between the control rods and the lower side members of the chassis, it may be advantageous to extend gooseneck clevises 66 upwardly from the pedestals 65 to provide the swing connection for the control rods. Clevises 66A and 66B are presented from pedestal 65A for the connection of control rods 51 and 52, respectively, and similar clevises 66C and 66D are presented from pedestal 65B for the connection of control rods 53 and 54.

Figure 5:
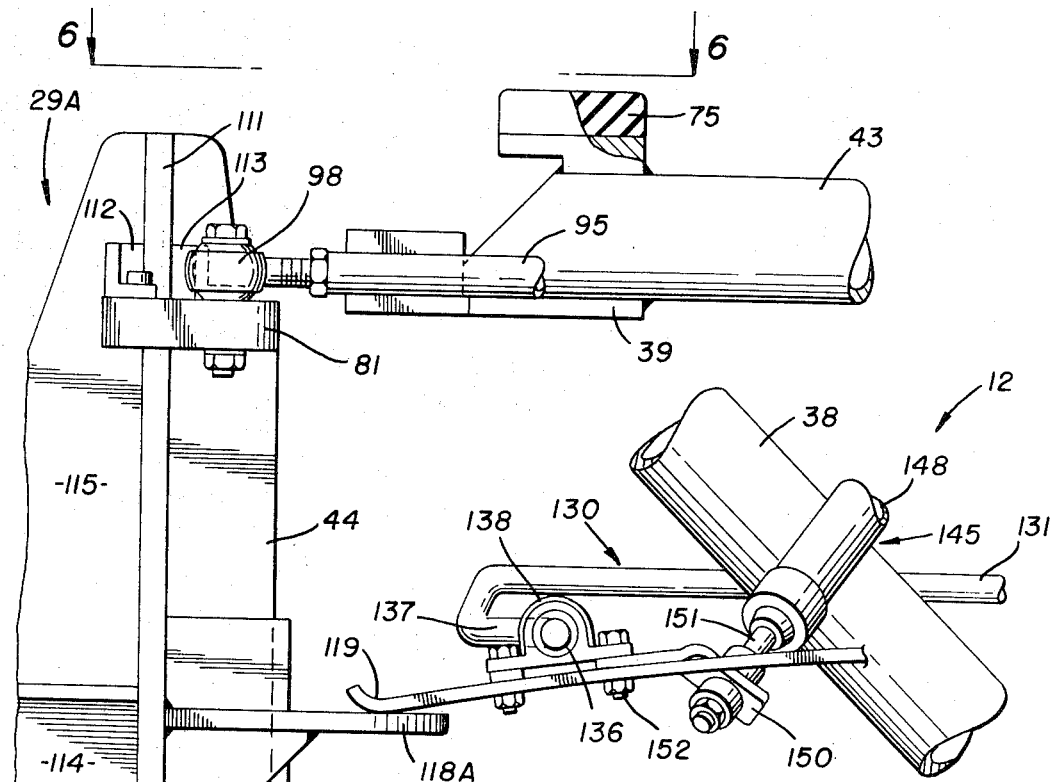
FIG. 5 is an enlarged area of FIG. 1 depicting the details of the preferred connections between one running gear, the axle, the suspension system and a tie rod in the steering system.

As shown in FIG. 5, the rotatable connection may incorporate a bearing plate 44' affixed to the bottom of pillar 44. A bolt 67 extends through a locking plate 68 and is tightened into the pillar 44 and bearing plate 44'. The plate-like pedestal plate 65 is sandwiched between the bearing and lock plates 44' and 68 with a spacer bushing 67', having an axial dimension slightly in excess of the thickness of the pedestal plate 65, encircling the bolt 67 to permit the lock plate to be firmly secured to the pillar 44 and bearing plate 44' but in sufficiently spaced relation to allow the pillar to rotate freely with respect to the pedestal plate 65.

Although many details in the refinement of the subject concept are yet to be described, the basic concept by which chamber is controlled in response to the inertial forces induced by the chassis during the turn can be most easily imparted by reference to the skeletal structure already described. Armed with this fundamental understanding the subsequently described refinements will be more easily understood.

FIG. 1 then, is representative of the vehicle moving along a straightaway course. The tread 69 and 70 on the tires 71 and 72 of both wheels 62 and 64, respectively, are fully in contact with the surface 73 of the roadway, and the chassis 11 has a neutral orientation with respect to the axle means 30.

Figure 7:
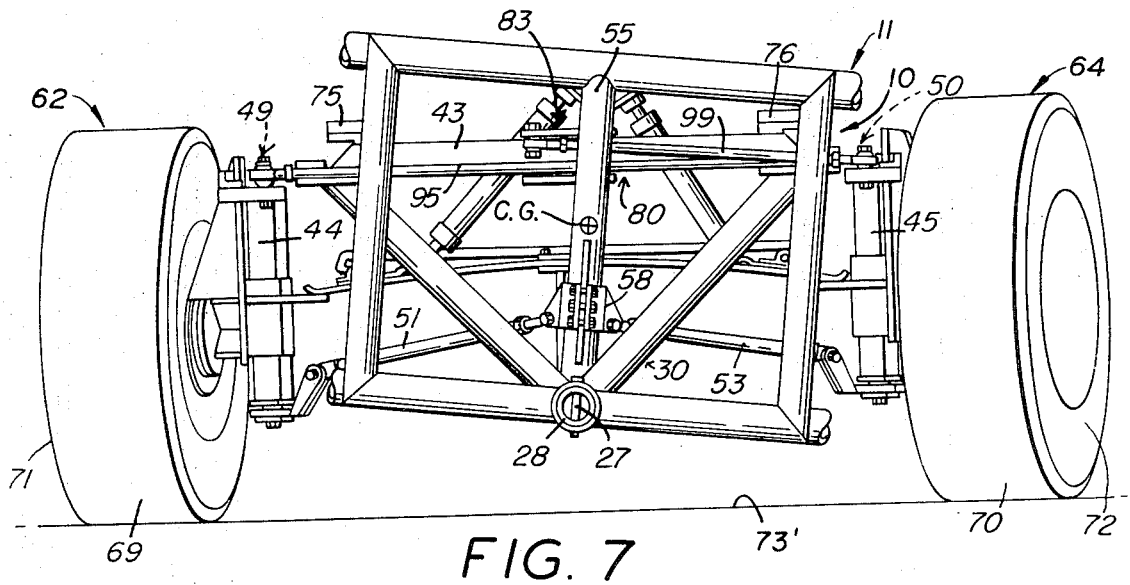
FIG. 7 is a reduced frontal elevation similar to that shown in FIG. 1, depicting the undercarriage, suspension and chassis in the relative dispositions assumed by the foregoing components in a turn at relatively high speed.

FIG. 7, however, is representative of the vehicle in a turn. More particularly, the vehicle is turning to its right so that as the viewer observes FIG. 7 the right-hand side of the figure represents the "outside" of the turn and the left-hand side represents the "inside" of the turn—the direction toward which the vehicle is turning. The inertia of the vehicle results in a centrifugal tendency that must be counteracted by the centripetal force applied against the treads 69 and 70 of tires 71 and 72 from the roadway surface to prevent the vehicle from skidding toward the outside of the turn. Some roadways have superelevated curves through turns, as represented by numeral 73' in FIG. 7, to reduce the amount of centripetal force applied as a purely lateral force against the tire tread. However, superelevated curves can only reduce the lateral application of centripetal force to an optimum degree for the particular speed for which the curve was designed so that even with superelevated curves a component of centripetal force can be considered as being primarily applied by the roadway laterally against the tire treads.

The centrifugal tendency of the chassis 11 acts as a force through the center of gravity C.G. thereof and that causes the chassis 11 to roll, about the axis 27 (defined by the mounting beam 28), toward the outside of the turn. As best shown in FIG. 1, resilient limit blocks 75 and 76 mounted on the chord member 43 of the axle means 30 are engageable by the upper side members 18 and 19, respectively, to limit the angular range through which the chassis 11 can rotate. It has been found that up to a 6° roll angle is quite adequate to provide the desired camber control. Moreover, such a minimal roll angle affords a very comfortable ride to the occupant of the vehicle.

The inertia-induced roll of the chassis 11—about the longitudinal roll axis 27, as noted above—is relative to the axle means 30 which maintains an orientation parallel to the roadway, even when the surface is superelevated, as represented by the numeral 73'; the disposition of chord member 43 provides an excellent frame of reference for determining the orientation of axle means 30 with respect to either the roadway or the chassis.

As the chassis 11 thus rolls with respect to the axle means 30, the roll transfer posts 55 and 56 are swung through an angular displacement about mounting beam 28, and thus the roll axis 27, concomitant with the degree of angular roll to which the chassis is subjected. The angular displacement of the roll transfer posts 55 and 56 occasioned by the turn depicted in FIG. 7 applies a compressive force to control rods 53 and 54 and a tensile force to control rods 51 and 52.

The compressive force applied to control rods 53 and 54 forces the pillar 45 and axle means 30 to swing with respect to each other, about pivot means 50, so that even though the chassis 11 rolls toward the outside of the turn, the camber is controllably maintained in response to the inertia-induced chassis roll—and, controlled so as to augment road contact across the full tread surface 70 by tending to hold the wheel 64 on the outside of the turn in the most auspicious orientation with respect to the roadway as possible and hereby maintain as much tread surface as possible in contact with the roadway for accepting the lateral thrust imposed against that tire by the roadway.

At the same time, the tensile force applied to control rods 51 and 52 forces the pillar 44 and axle means 30 to swing with respect to each other, about pivot means 49, so that the camber of wheel 62 on the inside of the turn is also controlled to benefit the receipt of thrust from the roadway against that tire as well.

The optimum result would be to have the pillars swing in response to the chassis roll so that a precise degree of camber is maintained. This may vary from vehicle to vehicle and also from roadway to roadway. However, by employing collars 58 and 59 that are selectively positionable along the respective roll transfer posts 55 and 56, the degree of camber control in response to a given degree of chassis roll can be preselected.

In determining the position of the collars 58 and 59 along the roll transfer posts 55 and 56 it must be borne in mind that the collars must be positioned such that the line of action of the forces transferred by the control rods 51–54 must pass below the center of gravity C.G. (FIG. 7) at a sufficient distance so that the roll of the chassis effects an application of force against pillars 44 and 45 that is greater than any force reversely applied to the control rods by way of a lateral thrust generated by the roadway against the tires. Otherwise, the maintenance of camber control will completely deteriorate and the pillars 44 and 45 will both fold—i.e., the lower ends thereof will swing toward the inside of the turn—thereby causing the tread on the tires to lose substantial contact with the roadway.

Because of the fact that the collars 58 and 59 are selectively positionable along the roll transfer posts, it is mandatory that the control rods 51 and 54 be of adjustable length to permit selection of the desired degree of camber to the wheels in the static condition of the vehicle.

While adjustment of the lengths of the control rods may be accomplished by any number of constructions, the control rods, as exemplified by rod 51 and as best shown in FIG. 5, may have a sheath portion 77 in which an extension portion 78 is threadably received for varying the relative axial positions therebetween. A lock nut 79 may then be employed to maintain the degree to which the extension portion 78 extends outwardly of the sheath portion 77.

Figure 8:
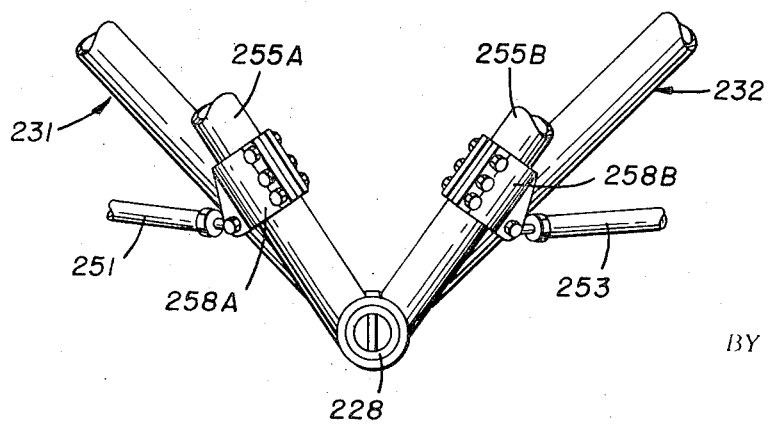
FIG. 8 depicts an alternative form of roll transfer means.

It must also be appreciated that the roll transfer means need not comprise a single vertical post. For example, it may be desirable to present an access between the laterally and upwardly directed arm portions of the axle means, and such an access could be effectively blocked by the roll transfer means if a single, substantially vertical post were employed. When one desires to preclude this result, the roll transfer means may well comprise branch posts 255A and 255B, as shown in FIG. 8, that extend diagonally upwardly from their rotatable connection to the mounting beam 228. When employing branch posts for the roll transfer means control arm 251 would be connected to branch post 255A through a collar 258A, and control arm 253 would be connected to branch post 255B through a collar 258B. By this construction access to and through the area upwardly of the axle arms 231 and 232 is impeded. Although this arrangement may be employed with equal facility to the use of vertically oriented roll transfer posts, the branch post arrangement has particular utility, for example, when used with rear suspensions and the necessity for accommodating a drive train or gaining facile access to a differential is occasioned.

The subject suspension also permits selective adjustment of caster and selective variation of the degree of caster through a turn. With the four control rods 51–54 being adjustable as to length, the static caster of the pillars 44 and 45 may be preselected. With the collars 58 and 59 located at the same relative heigths on their respective roll transfer posts above mounting beam 28—i.e., the roll axis 27—the preselected degree of caster will remain substantially unchanged through a turn. However, by selectively placing the collars 58 and 59 at unequal vertical distances above the roll axis 27, the caster will vary through a turn.

Specifically, if the rearward collar 59 is located somewhat higher than the forward collar 58, chassis roll will induce an increase in caster on the outside wheel. Inasmuch as the outside wheel is that burdened by any weight transfer, positive caster for that wheel will tend to return the wheels to their straightaway course. At the same time that positive caster is being afforded to the outside wheel, negative caster will be simultaneously applied to the inside wheel. That, too, is desirable since negative caster will tend to assist turning of the wheels into the turn, and, with any weight transfer reducing the load on that wheel the tendency of the wheel to steer into the turn will be of lesser magnitude than the tendency of the outside wheel to return to a straightaway course.

Because the steering mechanism must be inexorably associated with control of camber and/or variation in caster through a turn, a preferred steering mechanism, indicated generally by the numeral 80 in FIG. 2, shall now be described.

A steering arm 81 is affixed to and extends from pillar 44 so that the application of force thereto selectively rotates the pillar 44 about its own axis 60. In the preferred orientation the steering arm 81 extends forwardly with respect to the vehicle when the wheel 62, rotatably mounted on spindle 63, is directed for straightahead travel. A steering arm 82 is similarly affixed to extend forwardly from pillar 45 when the wheel 64 rotatably mounted on spindle 65 is directed for straightahead travel.

A compensating member 83 is mounted for rotation on the axle means 30 about an axis 84 substantially parallel to the axes 60 and 61 of pillars 44 and 45. Specifically, a stub shaft 85 extends vertically through the medial portion of chord member 43, and the compensating member 83 is journaled thereon.

Figure 9:
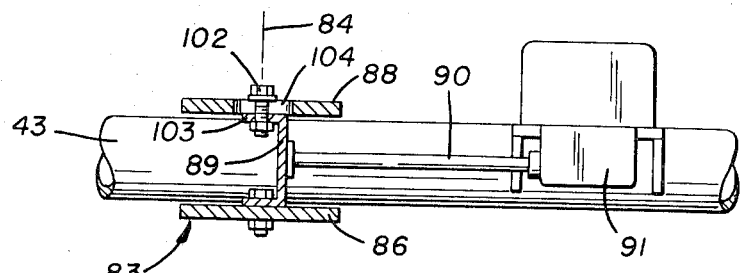
FIG. 9 is an enlarged transverse section, taken substantially on line 9—9 of FIG. 2, depicting the compensating member in cross section and the steering box, to which it is operatively connected, in elevation.

As best seen in FIG. 9, the compensating member 83 is comprised of vertically spaced sector plates 86 and 88 adjustably conjoined by a web plate 89. A drag link 90 operatively connects the web plate 89 to a conventional steering box 91 mounted on the same support as the compensating member 83—the chord member 43 of axle means 30.

A connecting ear 92 extends outwardly from the sector plate 86, and a similar connecting ear 93 extends outwardly from sector plate 83. The connecting ears 92 and 93 are spaced circumferentially with respect to the axis 84 and equally with respect to a neutral reference plane 94, as shown in FIG. 2, when the wheels 62 and 64 are directed for straightahead travel, for reasons that will hereinafter become more fully apparent.

The inner end of a tie rod 95 is pivotally secured, as by a pin joint 96, to connecting ear 92 and the outer end is pivotally secured, as by pin joint 98, to the steering arm 81. The inner end of a similar tie rod 99 is pivotally secured, as by a pin joint 100, to connecting ear 93 and the outer end is pivotally secured, as by pin joint 101, to steering arm 82. As such, the inner end portion of each tie rod 95 and 99 is connected to that side of the compensating member 83 which is remote from the connection of the outer end portion of that tie rod to the respective steering arm so that the inner end portions overlap.

By using this unique arrangement the wheels steered thereby may be turned through different angles. In fact, the wheel inwardly of the turn may be steered through a greater angular degree than the wheel outwardly of the turn in order to achieve the Ackerman effect. The relative radii of the pin joints 96 and 100 from axis 84 with respect to the radii of the pin joints 98 and 101 from axes 60 and 61, respectively, as well as the angular displacement of connecting ears 92 and 93 will control the angular degree through which wheels 62 and 64 are steered.

It must be appreciated that the connection of the tie rods to the steering arms are also preferably longitudinally aligned when the wheels are directed straight ahead. As exemplified by the construction shown in FIG. 6, the pin joint 98 would then be located in longitudinal alignment with the axis 60 of pillar 44. By this configuration a change in camber will not itself tend to induce a steering change while the vehicle is moving straight ahead and will minimize steering changes induced by camber change during a turn.

To permit a selective variation as to the differential to which wheels on the inside and outside of a turn will be steered, one may make the sector plates 86 and 88 relatively positionable. As shown in FIG. 9 this may be accomplished by fixedly securing the web plate 89 to sector plate 86 and adjustably securing the web plate 89 to sector plate 88. For the latter connection a bolt 102 through flange 103 on web plate 89 may be received in a slot 104 in sector plate 88, the slot 104 being arcuate about axis 84.

Figure 10:
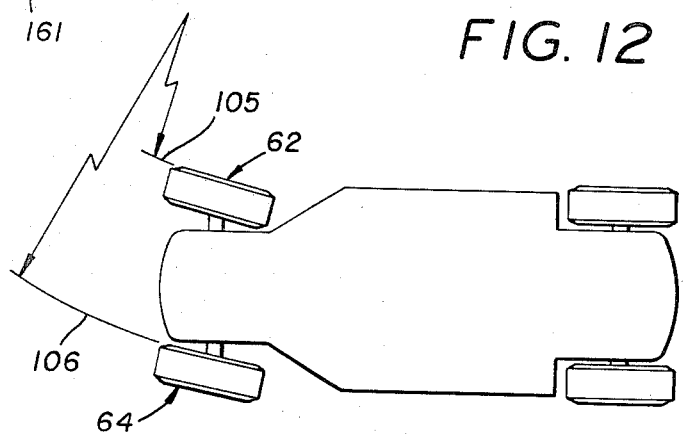
FIG. 10 is a schematic top plan of a vehicle incorporating the undercarriage, suspension system and steering mechanism of the subject invention depicting how the steered wheel remain tangent to their own turn-circles.

In the exemplary construction depicted in FIG. 2, the connecting ears 92 and 93 are circumferentially spaced at approximately 50°—i.e., 25° on either side of the neutral reference plane 94 when the wheels 62 and 64 are directed straight ahead so that steering in either direction will afford concomitant results. As such, with the radii of the pin joints 96, 98, 100 and 101 from the respective axes 84, 60, 84 and 61 about which they rotate being substantially equal, a twenty-five degree rotation of the compensating member 83 in either direction will result in a rotation of the pillar supporting the wheel on the inside of the turn through approximately 30° and, simultaneously, rotation of the pillar supporting the wheel on the outside of the turn through approximately 24°. In this way the inner and outer wheels will be directed substantially along tangents to their separate turning arcs. As shown in FIG. 10, a rotation of the pillar supporting wheel 62 on the inside of the turn through approximately 30° will maintain that wheel directed along a tangent to turning arc 105 and, similarly, a rotation of the pillar supporting wheel 64 on the outside of the turn through approximately 24° will maintain that wheel directed along a tangent to turning arc 106.

Moreover, this differential steering of the wheel inwardly of the turn and the wheel outwardly of the turn—in substantial conformity with the Ackerman effect—is accomplished by a relatively uncomplicated mechanism that permits the tie rods to be oriented so that their connections to the steering arms 81 and 82 lie forwardly of their connections to the compensating member 83. In this way shock loading on the wheels 62 and 64 will, in general, apply a tensile loading to the tie rods 95 and 99.

In the undercarriage 10 heretofore described the spindle means 63 and 65 on which the wheels 62 and 64 are journaled, could well have been affixed to the respective pillars 44 and 45 so that any standard suspension could be interposed between the axle means 30 and the chassis 11. However, in the preferred embodiment depicted the running gear 29A and 29B are slidingly suspended from the spindles 44 and 45 in order to obtain the benefits of an independent suspension for the wheels 62 and 64.

As best seen in FIG. 5, a box-like sleeve 110A is slidably received on pillar 44, and the spindle means 63 extends laterally outwardly of the sleeve 110A. A wing plate 111 is secured to the sleeve 110 and extends along one face of the rectilinear pillar 44. The wing plate 111 is slidingly received between opposed bearing blocks 112 and 113 secured to rotate with pillar 44 about axis 60 in order to extend the base of support afforded by the pillar 44 to the sleeve 110A. A lateral block 114, reinforced by a gusset plate 115, may be provided to extend the spindle means 63 laterally outwardly of the sleeve 110A. This lateral extension insures clearance between the wheel and the vehicle for turning and permits ample space for locating a brake means not shown.

A similar sleeve 110B (FIGS. 1 and 3) may be slidably supported on pillar 45 to present the spindle means 65 on which wheel 64 is journaled. One portion of the suspension system 12 particularly adapted to an undercarriage embodying the subject concept, and which operates to minimize weight transfer, is best depicted in FIGS. 1, 3, 5 and 11. Referring first to FIG. 5, a perch plate 118A extends laterally inwardly of the sleeve 110A, and oppositely of spindle 63. A similar perch plate 118B is secured to pillar sleeve 110B in opposition to perch plate 118A.

Figure 11:
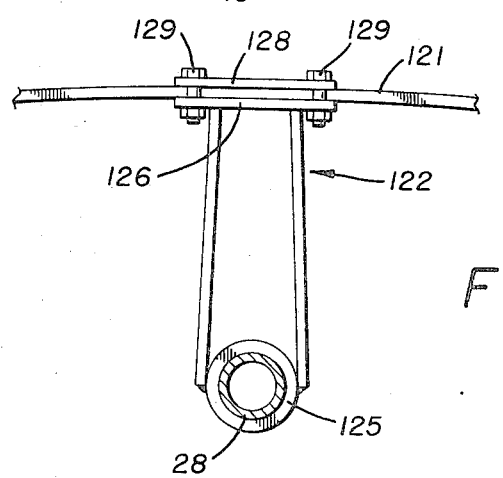
FIG. 11 is an enlarged transverse section taken substantially on line 11—11 of FIG. 3 and depicting, in elevation, the stanchion by which the spring means operative between the opposed running gear on one axle means and the chassis is supported from the latter.

The ends 119 and 120 of a leaf spring 121 are slidably received on the perch plates 118A and 118B, and the medial portion of the spring 121 is secured to a stanchion 122 rotatably mounted about the roll axis of chassis 11, as delineated by the mounting beam 28. As shown in FIG. 11, the base of stanchion 122 presents a sleeve 123 journaled on the tubular mounting beam 28. A pair of collars 124 and 125 (FIG. 3) embrace the sleeve 123 and are affixed to beam 28 to constrain the stanchion against movement axially of the beam 28 and yet permit it to rotate with respect thereto.

The spring 121 is received across a shelf 126 at the top of the stanchion 122 and an anchor plate 128 is tightened, as by a plurality of bolts 129 to capture the medial portion of spring 121 firmly between the anchor plate 128 and shelf 126. The configuration of the spring, the work required to flex the spring and the height of the stanchion 122 must be balanced against the weight of the sprung mass—in this case the chassis 11 and axle means 30—to assure that the pillar sleeves 110A and 110B will ride along the medial portion of pillars 44 and 45, respectively, when supporting the vehicle under normal conditions.

At this point one must recognize that in order for the running gear to obtain the benefit of an independent suspension, two conditions must obtain. First, there should be a nominal delay after an abrupt vertical motion of either running gear supported on the axle means 30 in order, for example, to allow the wheel to engage a bump in the road or drop into a chuck hole without effecting an instantaneous change in the chamber and/or caster of the wheels. Second, the axle means 30 should, after such nominal delay, be urged constantly to assure an orientation parallel to a plane incorporating the ground contact of both wheels supported on that axle with the roadway.

The use of an equalizer beam 130 in conjunction with spring 121 assures that result.

Equalizer beam 130 is resiliently mounted on the axle means 30. As best shown in FIGS. 2, 3, 4 and 5, the torsional shaft portion 131 of beam 130 is supported in a pair of resilient bushings 132 and 133 carried in housings 134 and 135 secured to the ribs 38 and 41 of axle arms 31 and 32, respectively; the axis of said shaft portion 131 is oriented to lie generally transversely of the axes 60 and 61 of pillars 44 and 45. A transfer arm 137 extends radially from one end of the shaft portion 131 and is received in a resilient bushing 136 carried in a terminal housing 138 secured in immediate proximity to the end 119 of spring 121 slidably engaging the perch plate 118A. A similar transfer arm 139 extends radially from the other end of the shaft portion 131 and is received in a resilient bushing 140 carried in a terminal housing 141 secured in immediate proximity to the end 120 of the spring 121 slidably engaging the perch plate 118B. The equalizer beam 130 is thus of generally U-shaped configuration (FIG. 3), as has been found important to its proper operation.

The suspension system 12 also includes components to effect a spring action between the undercarriage 10 and the chassis 11. In order to obtain the best results from an undercarriage 10 embodying the concept of the present invention such components preferably function between the running gear and the chassis rather than directly between the axle means 30 and chassis 11. As best shown in FIGS. 1, 2 and 5, a spring means in the form of an air spring 145 acts between the chassis 11 and the pillar sleeve 110A. Specifically, a mounting rod 146 on the base of cylinder portion 148 is secured to a bracket 149 carried on the upper transverse member 21 of chassis 11. A mounting flange 150 connected to the piston rod portion 151 of air spring 145 is secured to spring 121 in proximity to that end 119 that slidably engages perch plate 118A. In fact, mounting flange 150 may be secured to spring 121 by one of the bolts 152 used to fasten the terminal housing 138 to spring 121.

An air spring 153 may be similarly mounted between the transverse member 21 of chassis 11 and the end 120 of spring 121 that slidably engages the perch plate 118B on sleeve 110B.

Simultaneous vertical motion of both wheels 62 and 64 with respect to the axle means 30 will effect simple rotation of the equalizer beam within bushings 132 and 133 so that the orientation of the axle means 30 with respect to roadway 73 (FIG. 1) will, therefore, tend to remain unchanged. Accordingly, except for whatever torsional force is required to overcome the frictional engagement between the bushings 132 and 133 and the shaft portion 131 of beam 130, the flexure of leaf spring 121 and the reciprocating action of air springs 145 and 153 are responsible for dampening the transfer of vertical oscillations from the running gear 29A and 29B into the axle means 30 and chassis 11.

Figure 12:
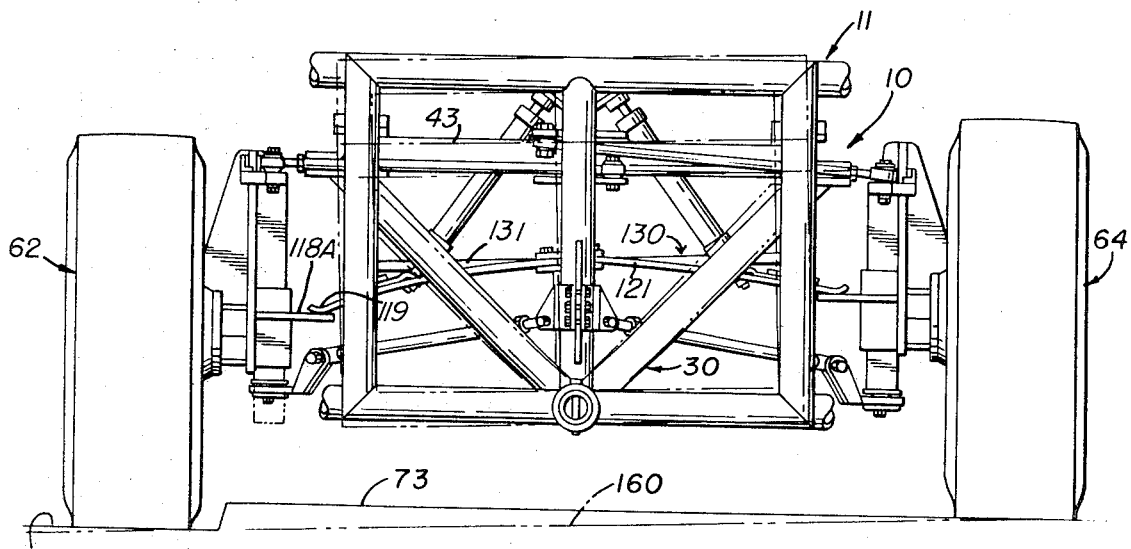
FIG. 12 is a reduced frontal elevation, similar to that shown in FIG. 1, depicting, in solid line, the disposition assumed by the undercarriage, suspension and chassis instantaneously after one wheel has dropped below the level of the roadway (the berm, as shown) and further depicting, in phantom, the disposition assumed by those components if the wheel does not momentarily return to the level of the roadway.

However, when only one wheel is subjected to a vertical displacement, the equalizer beam 130 cooperates with spring 121 to effect a maintenance of the axle orientation parallel to the plane 160 incorporating the ground contact of both wheels with the roadway, or adjacent environs, as shown in FIG. 12. If, for example, the wheel 62 drops off roadway 73 onto the lower berm 161, as shown in FIG. 12, a downwardly directed force will be applied to transfer arm 137 as it is carried downwardly with the end 119 of spring 121 following perch plate 118A. At the same time, because wheel 64 remains on the level of roadway 73, an upwardly directed force will be applied to transfer arm 139 as it tends to resist rotation of the shaft portion 131 necessary to accommodate the downward movement of transfer arm 137. The resulting torsional stresses applied to the shaft portion 131 result in an attempt on the part of the shaft portion 131 to assume a position wherein it will be stress free—i.e., it tends to "equalize" the stresses, and as it does so it reorients the axle means 30 so that it, as measured by the orientation of chord member 43, lies parallel to plane 160.

The shock loading applied to the wheel 62 as it drops from roadway 73 onto the berm 161 is dampened, in part, by spring 121 and, in part, by the torsional deformation of equalizer beam 130. At this point it should be appreciated that the modulus of elasticity of the shaft portion 131 relative to the work expended toward deformation thereof, as by the application of forces producing the torsional stress in the shaft portion 131, will effect a nominal delay between the moment that the wheel 62 drops off roadway 73 (as shown by the solid line representation in FIG. 12) and the moment that the axle means 30 tends to seek its normal orientation parallel to plane 160 (as shown by the chain line representation in FIG. 12). By providing this nominal delay, the sudden vertical oscillation of one wheel, as when dropping into a chuck hole and then returning to the roadway 73, will not occasion an artificial orientation of the axle means 30.

It should also be appreciated that an undercarriage embodying the concept of the present invention may also be constructed in combination with a suspension system that does not effect minimization of weight transfer. Such a suspension 12R is shown in conjunction with a typical rear axle 30R arrangement depicted in FIGS. 13 and 14.

Even a suspension 12R constructed so as not to effect minimization of weight transfer will beneficially incorporate an equalizer beam 130R mounted on the arms—rib 36R of axle arm 31R shown—of axle means 30R (in the same general manner as equalizer beam 130 is mounted on axle means 30) to interact against perch plate 118R secured to running gear 29R. When no leaf spring 121 is employed, however, the terminal housing 138R is secured directly on the perch plate 118R.

The running gear 29R has a spindle means 63R that extends laterally of a wing plate 111R, and a pair of sleeves 110R and 110R' are secured to the wing plate 111R for slidably engaging longitudinally spaced pillars 44R and 44R' pivotally depending from axle means 30R. This tandem pillar arrangement may be readily employed for stability if the wheel mounted thereon is not a steered wheel.

A lug 164 extends laterally inwardly of the wing plate 111R, preferably upwardly of and between the pillars 44R and 44R', to receive the anchor bolt 165 by which the piston rods 166A and 166B of a double air spring 168 may be secured. The cylinder portions 169A and 169B are pivotally fastened, as by bolt 170, to one end of a link 171 the opposite end of which is pivotally fastened, as by bolt 172, to an outrigger arm 173 affixed to a longitudinal strut 174 in the framework of chassis 11. A brace 175 extends between a laterally spaced strut 176 in chassis 11 and the outrigger arm 173.

By selective pressurization of the air spring 168 the sleeves 110R and 110R' can be positioned at the desired location along the pillars 44R and 44R'—generally medially thereof when the vehicle is at rest. The normal oscillations of the running gear 29R will be dampened by the air spring 168. However, should the wheel mounted on spindle means 63R suddenly drop to such an extent that the full outward stroke available to the piston rods 166A and 166B would be attained, experience has shown that it is highly desirable to impart some reserve stroke so that the pistons (not shown) with cylinders 169A and 169B will not slam against the structure in the cylinders that delineates the outermost extent to which the rods 166A and 166B can be protracted. The link 171 interposed between the outrigger arm 173 and the cylinders 169A and 169B provides the reserve travel necessary to preclude any undue stress to the air spring 168 that would be occasioned should the sleeves 110R and 110R' travel beyond their normal downward range along the pillars 44R and 44R'.

In FIG. 13 the solid line representation depicts the normal orientation of link 171 as it abuts the stop wall 178 in hood 179 secured to the end of the outrigger arm 173. The chain line representation depicts the orientation that is assumed by link 171 after it has swung away from the stop wall 178 to accommodate the demand for a maximum increase in the outwardly directed travel range of the air spring rods 166A and 166B.

The upwardly directed arrow F in FIG. 13 represents the resultant force applied against the tire 180 by the roadway 73. This force F applies a moment to the running gear 29R that would tend to bind the sleeves 110R and 110R' on pillars 44R and 44R'. The outrigger arm 173 is, therefore, preferably dimensioned so that the air spring 168 is oriented to apply a generally balancing moment to the running gear 29R in order to facilitate the sliding engagement of the sleeves 110R and 110R' along pillars 44R and 44R'.

It should now be apparent that an undercarriage and suspension system embodying the concept of the present invention harnesses the inertia of the vehicle chassis through a turn beneficially to control the camber of the wheels, and, selectively, adjust the caster while offering the benefits of independent suspension, steering that substantially achieves the Ackerman effect and otherwise accomplishes the objects of the invention.

I claim:

1. An undercarriage for a vehicle having a chassis with a longitudinal roll axis, said undercarriage comprising, an axle means having opposed arms, gudgeon means for securing the axle means to the chassis so that relative swinging movement can be accommodated between the chassis and axle means about the longitudinal roll axis of the chassis, said axle arms extending laterally of said gudgeon means and terminating in opposed pivot means, a pillar means dependingly secured from each said pivot means, a spindle means extending outwardly of each said pillar means for mounting a wheel, at least one control rod having opposed ends for each axle arm, one end of each control rod connected to the chassis upwardly of said gudgeon means, the opposite end connected to the pillar on the corresponding axle arm in spaced relation beneath said pivot means.

2. An undercarriage as set forth in claim 1, in which suspension means are operatively connected between said undercarriage and the chassis.

3. An undercarriage, as set forth in claim 2, in which the suspension system divides the chassis and components of the undercarriage into sprung and unsprung masses, at least the sprung mass having a center of gravity, and in which the connection between the control rods and the chassis is located beneath the level of said center of gravity.

4. An undercarriage, as set forth in claim 1, in which the chassis presents roll transfer means, anchor means selectively positionable along said roll transfer means, the ends of said control rods connected upwardly of said gudgeon means attached to said anchor means, and each said control rod being of adjustable length.

5. An undercarriage, as set forth in claim 4, in which the chassis presents longitudinally spaced roll transfer means and in which two control rods are associated with each axle arm, one end of the two control rods associated with each axle arm connected to the pillar means dependingly secured to that axle arm, anchor means attached to the opposite ends of said control rods, said control rods extending divergently from said pillar means such that the anchor means on the ends thereof are individually positionable at selected locations along a corresponding roll transfer means.

6. An undercarriage, as set forth in claim 5, in which the anchor means is secured to each roll transfer means in spaced relation below the center of gravity of the vehicle sufficiently that the moment applied to the roll transfer means by the chassis will exceed the moment applied to the pillar means by lateral thrust against the wheels.

7. An undercarriage, as set forth in claim 6, in which the gudgeon means is rotatably secured to a longitudinal mounting beam that is affixed to, and delineates the roll axis, of the chassis, said roll transfer means comprising a pair of longitudinally spaced posts having upper and lower ends, the upper end of each said post rigidly secured to the chassis, the lower end of each said post rigidly secured to said mounting beam.

8. An undercarriage, as set forth in claim 6, in which the gudgeon means is rotatably secured to a longitudinal mounting beam that is affixed to, and delineates the roll axis of, the chassis, said roll transfer means comprising a pair of longitudinally spaced, V-shaped members, each V-shaped member having laterally spaced upper ends and a common apex, the upper ends of said V-shaped member rigidly secured to the chassis and the apex of each V-shaped member rigidly secured to said mounting beam.

9. An undercarriage, as set forth in claim 1, in which steering is accomplished by rotation of the pillars about their own axes, a steering arm connected to each pillar, said axle arms being rigidly conjoined to form a unitary axle means, a compensating member mounted on the axle means for selective rotation by the driver about an axis substantially parallel to the axes of said pillars, opposed steering tie rods having inner and outer ends, the outer end of one tie rod being connected to each steering arm, the inner end of each tie rod being connected to that side of said compensating member which is remote from the steering arm to which that tie rod is connected.

10. An undercarriage, as set forth in claim 9, in which the connection of the tie rods to the compensating member is angularly adjustable with respect to the axis about which the compensating plate rotates.

11. An undercarriage, as set forth in claim 9, in which the steering arms extend forwardly of their respective pillars when the wheels steered thereby are directed forwardly and in which the connections of said tie rods to said steering arms lie forwardly of the connections of said tie rods to said compensating member.

12. An undercarriage, as set forth in claim 11, in which the connection of the tie rod to the steering arm is longitudinally aligned with the axis of the pillar to which it is secured when the wheels are directed for straight ahead travel.

13. An undercarriage, as set forth in claim 2, in which each spindle means is secured to a sleeve means, said sleeve means being slidably received on the corresponding pillar means, and in which said suspension comprises, spring means operative between said sleeve means and said chassis, and an equalizer means operative between said sleeve means and said axle means.

14. An undercarriage, as set forth in claim 13, in which the equalizer means comprises a beam having a shaft portion and a pair of spaced, transfer arms extending generally radially of said shaft portion, said shaft portion being rotatably secured to said axle means, one said transfer arm operatively connected to move with one of the sleeve means and the other transfer arm operatively connected to move with the other sleeve means.

15. An undercarriage, as set forth in claim 14, in which said equalizer beam has a substantially U-shaped configuration.

16. An undercarriage, as set forth in claim 15, in which the gudgeon means is rotatably secured to a longitudinal mounting beam that delineates the roll axis, and in which a pedestal is rotatably supported on said mounting beam, said spring means comprising a leaf spring affixed to said pedestal and operatively engaging said sleeve means.

17. An undercarriage, as set forth in claim 16, in which additional spring means are operatively connected between the chassis and each of said sleeve means.

18. An undercariage, as set forth in claim 15, in which an outrigger arm is secured to said chassis, a spring means operatively connected between said outrigger arm and said running gear.

19. An undercarriage, as set forth in claim 18, in which a link means is pivotally secured to said outrigger arm, said spring means pivotally secured to said link means.

20. An undercarriage, as set forth in claim 19, in which a wheel is mounted on said running gear for contact with a roadway, the force exerted by the roadway against said wheel applying a moment that tends to bind the sleeve means on said pillar means, said outrigger arm being dimensioned such that the spring means is oriented to apply a counterbalancing moment to said sleeve means.

References Cited

UNITED STATES PATENTS

| | | | |
|---|---|---|---|
| 2,576,686 | 11/1951 | Kolbe | 280—112.1X |
| 3,329,233 | 7/1967 | Kolbe | 280—112X |
| 3,408,088 | 10/1968 | Corbin | 280—96.2 |
| 3,485,506 | 12/1969 | Melbar | 280—112X |

PHILIP GOODMAN, Primary Examiner

U.S. Cl. X.R.

280—112